No. 726,665. PATENTED APR. 28, 1903.
L. P. FORD.
MOLD FOR THE MANUFACTURE OF BLOCKS OF ARTIFICIAL STONE.
APPLICATION FILED JULY 8, 1902.
NO MODEL. 3 SHEETS—SHEET 1.
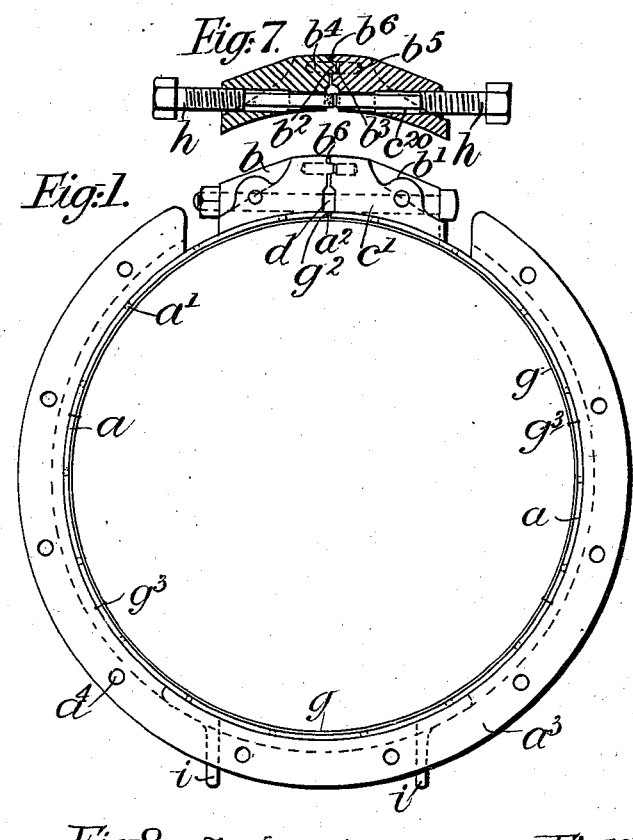

No. 726,665. PATENTED APR. 28, 1903.
L. P. FORD.
MOLD FOR THE MANUFACTURE OF BLOCKS OF ARTIFICIAL STONE.
APPLICATION FILED JULY 8, 1902.
NO MODEL. 3 SHEETS—SHEET 2.
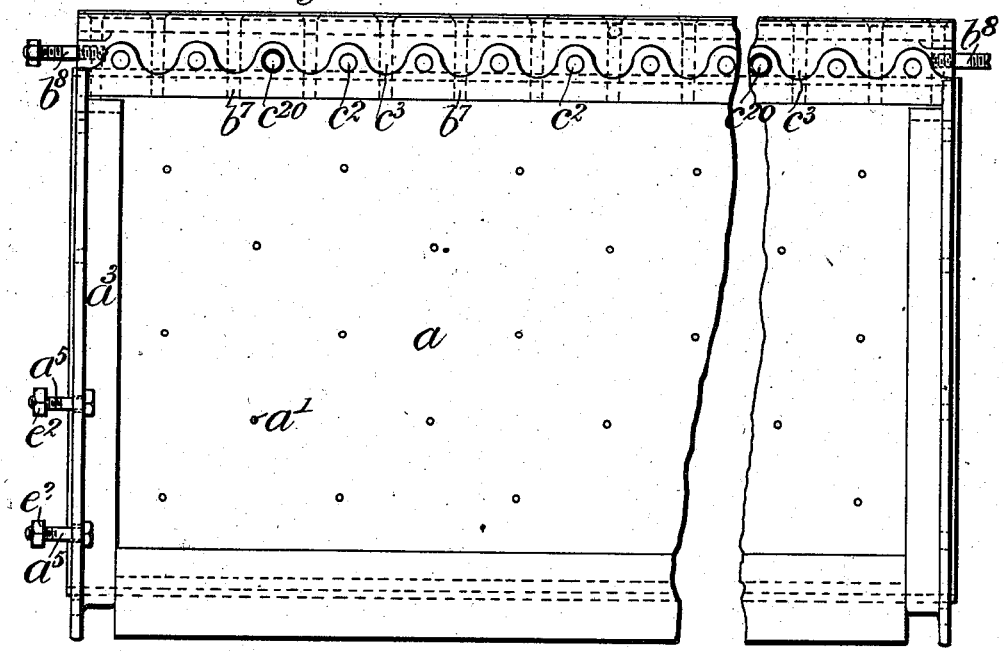
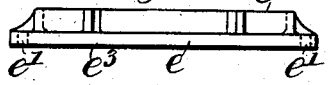
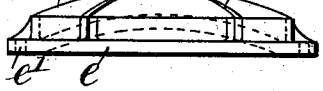
Witnesses:
M. A. Whitwell.
Wm. P. Hammond.
Inventor,
Lewis P. Ford,
By L. Knight Ford
Atty.

No. 726,665. PATENTED APR. 28, 1903.
L. P. FORD.
MOLD FOR THE MANUFACTURE OF BLOCKS OF ARTIFICIAL STONE.
APPLICATION FILED JULY 8, 1902.
NO MODEL. 3 SHEETS—SHEET 3.
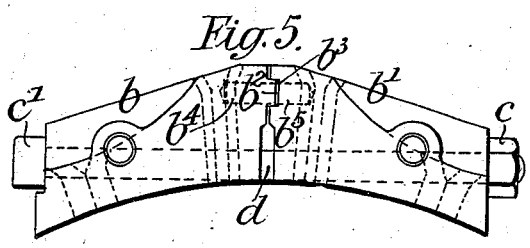
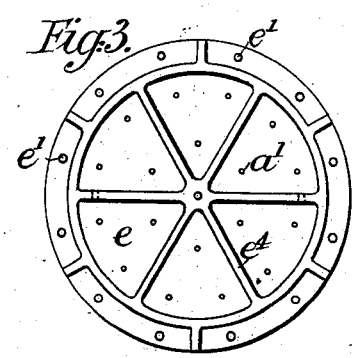
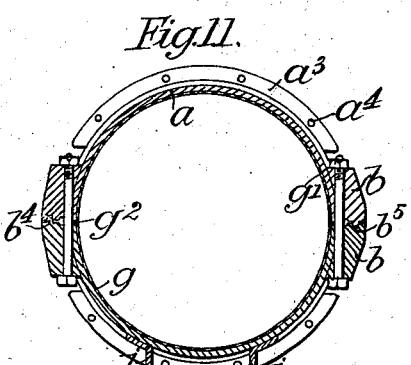
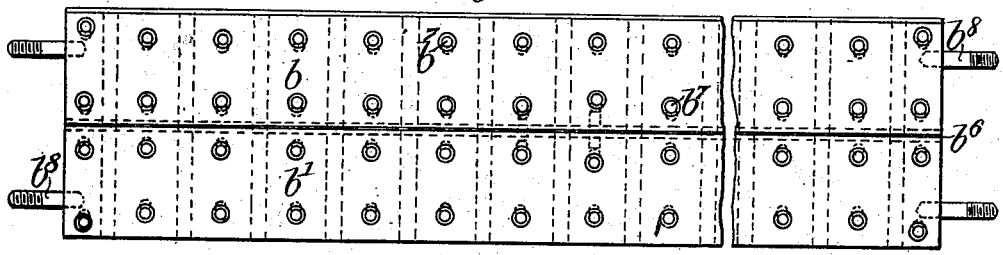

UNITED STATES PATENT OFFICE.

LEWIS PETER FORD, OF GRESFORD, ENGLAND.

MOLD FOR THE MANUFACTURE OF BLOCKS OF ARTIFICIAL STONE.

SPECIFICATION forming part of Letters Patent No. 726,665, dated April 28, 1903.

Application filed July 8, 1902. Serial No. 114,751. (No model.)

*To all whom it may concern:*

Be it known that I, LEWIS PETER FORD, a subject of the King of Great Britain, residing at Gresford, in the county of Denbigh, England, have invented a new and useful Mold for the Manufacture of Blocks of Artificial Stone, of which the following is a full, clear, and exact description, and for which I have made application for patent in Great Britain, dated December 23, 1901.

Hitherto when the expansion of materials has been resisted by a mold to obtain compression thereof and to form blocks of artificial stone from sand and lime with or without other materials it has been impossible to make such blocks of large size and free from cracks or "partings" in molds subjected to cold or highly-heated water or steam or to all or any of these in succession; but I am now able to do so by means of the present invention, which consists in the employment of a very strong cylindrical mold perforated with large holes and an inner plate or lining perforated with small holes, such holes being for the admission of the moisture required and subsequently for the egress of the steam and gases generated. A strong cylindrical mold perforated with a large number of small holes would answer the same purpose; but there is a greater difficulty in manufacturing the same. After a large number of costly experiments with various sizes, shapes, and thicknesses of molds and many sorts of chemical mixtures and varying processes I discovered that the cracks or partings were due generally not to the chemical action or peculiar process, but to the shape and want of rigidity of the molds hitherto used. I also dscovered that to obtain a good block of stone free from cracks and partings provision had to be made for even and uniform distribution of inlets and outlets for water, steam, air, and gases. It is especially essential that the mold be closed absolutely tight, so that the pressure generated therein by the expanding materials cannot open it to the smallest extent, and I have therefore invented a very secure closing means which answers with satisfaction.

The construction of my special mold to carry out the invention is illustrated in the accompanying drawings, in which—

Figure 1 is an end elevation, and Fig. 2 is a side elevation, of the mold with the ends removed. Figs. 3 and 4 are respectively a face view and an edge view of one of the ends. Fig. 5 is an end elevation, and Fig. 6 is a plan, of the special closing means shown separately. Fig. 7 is a detail view showing the method of opening the mold. Figs. 8, 9, and 10 are detail views showing a modification in the method of attaching the ends to the molds. Fig. 11 is an end view showing the mold made in two parts with two sets of closing means; and Fig. 12 shows a domed end which may be employed, if desired.

The mold consists of a plate $a$ of cylindrical form, having a number of holes $a'$, preferably a half-inch in diameter, formed therein over its entire surface and at about equal distances apart. They are arranged, preferably, one foot apart in rows, and the rows are arranged six inches apart, as shown at Fig. 2, the holes $a'$ of each row being intermediate of those in the adjacent rows.

The mold $a$, as shown in Figs. 1 and 2, is formed with a butt-joint $a^2$ on one side thereof and is provided with very secure fastening means which will insure a water-tight joint under high pressure. It is essential that whatever form of fastening means may be employed the cylindrical form of the mold must not be altered and the joint $a^2$ must be maintained absolutely rigid. The fastening means shown in the drawings consists of two castings or forgings $b\ b'$, the one, $b$, having a a wedge-shaped tongue $b^2$ along its entire length and the other, $b'$, having a similar-shaped groove $b^3$ to receive the said tongue $b^2$. The casting or stamping $b$ is further provided with one or more pins $b^4$, which pass into and fit one or more sockets $b^5$, formed in the casting $b'$. The object of the tongue $b^2$ and groove $b^3$ and pins $b^4$ and sockets $b^5$ is to keep the two castings $b\ b'$ in correct relative position to one another and prevent any vertical or endwise movement when the two parts $b\ b'$ are secured together by the nuts $c$ and bolts $c'$, passed through the holes $c^2$. It will be noticed that the castings $b\ b'$ are strengthened along the meeting edges; but they are formed with depressions $c^3$ between the bolt-holes $c^2$ to avoid undue weight and whereby I may use shorter rivets at the sides of the castings $b\ b'$. In order to get the whole of the power of the nuts and bolts $c\ c'$ exerted onto the shell or plate $a$, I form a recess $d$ in the castings $b\ b'$ at their lower part. The bolt-holes $c^2$ are placed in the castings $b\ b'$ in such a position that the bolts $c'$ touch the shell $a$ at the joint $a^2$, or in some cases they may be sunk into the body of the shell $a$, as shown in Fig. 11. The butt-joint $b^6$ is essential, as it prevents the internal pressure of the expanding materials bending the bolts $c'$ and causing the joint $a^2$ to open slightly on the inside. The castings $b\ b'$ fit the exterior of the plate $a$ and are preferably secured thereto by rivets $b^7$. The castings are slightly shorter than the plate $a$ and are provided with screwed studs $b^8$, which pass through some of the holes $e'$ in the end plates $e$.

The end plates $e$ of the mold are, like the plate $a$, provided with holes $a'$ for the passage of steam, water, air, or gases. The plate $a$ is provided, as shown in Figs. 1 and 2, with angle-irons $a^3$ around those portions of each end which are not occupied with the castings $b\ b'$, said angle-irons $a^3$ being provided with holes $a^4$ for bolts $a^5$, by means of which and the screwed studs $b^8$ the ends $e$ are securely held in position by nuts $e^2$. The ends $e$ are preferably made of cast-iron, with flat interior surfaces $e^3$ and strengthening-ribs $e^4$ on the exterior; but they may be made of dome shape, if desired, as shown in Fig. 12. In lieu of employing the angle-irons $a^3$ I may employ a number of brackets $f$, preferably as shown at Figs. 8, 9, and 10, which are secured to the plate $a$ by rivets $f'$. Such brackets $f$ would be provided with suitable holes $f^2$ for bolts $a^5$, by means of which the ends $e$ would be secured in position.

The mold $a$ is lined on its interior with a thin metal plate $g$, perforated over its entire surface with very small holes $g'$, arranged at equal distances from each other. These holes $g'$ should be preferably arranged one-half inch apart, which is very much closer together than the holes $a'$. The plate $g$ is provided with turned-out flanges $g^2$ along its meeting edges, which fit between the meeting edges $a^2$ of the plate $a$, and when the mold is ready for use the joint $a^2$ is perfectly water-tight under the required steam or water pressure. Similar perforated metal plates $g$ are also used to line the end plates $e$. The plates $g$ are secured to the supporting-plate $a$ and end plates $e$ by means of a few rivets $g^3$.

The perforations $a'$ in the outer shell $a$ are merely provided to form inlets and outlets from the exterior to the back of the thin perforated plates $g$, the perforations $g'$ of which in their turn provide inlets and outlets to and from the materials contained in the mold.

When it is desired to open the mold, one end is taken off and the nuts $c$ are unscrewed. Four of the bolt-holes $c^{20}$ are screw-threaded in their interior and four thrust-bolts $h$ (shown in Fig. 7) are inserted therein, which when tightened against each other cause the plate $a$ to spring open sufficiently to release the block of stone contained therein.

If desired, the mold may be made in two or more parts of either wrought or cast iron or other suitable material, each joint being rigidly connected together by the means herein shown and described, and if the inner plate is also made in corresponding sections all the edges of the inner plates must be secured between the edges of the outer plates in the same manner as above described.

The mold is preferably provided with runners $i$ for the purpose of preventing it rolling and to assist in moving it about, as is well understood.

What I claim as my invention, and desire to secure by Letters Patent, is—

1. In a mold for the manufacture of blocks of artificial stone, where use is made of the expanding property of lime or cement to obtain compression to solidify the blocks; the combination of a perforated body of flexible metal adapted to be strained in cylindrical form, means attached to said body near its meeting edges, for tightly closing the joint, detachable perforated ends and means for tightly securing said ends to the body, substantially as described.

2. In a mold for the manufacture of blocks of artificial stone, where use is made of the expanding property of lime or cement to obtain compression to solidify the blocks; the combination of a perforated body of flexible metal adapted to be strained in cylindrical form, means attached to said body near its meeting edges, for tightly closing the joint, a lining of thin metal having perforations smaller and closer than those in the body, detachable perforated ends and means for tightly securing said ends to the body, substantially as described.

3. A portable mold for the manufacture of blocks of artificial stone, consisting of a perforated cylindrical shell with abutting edges, means attached to said shell near its abutting edges for tightly closing the same, a finely-perforated lining of thin sheet metal, perforated end pieces, and means for securing the end pieces to the shell; substantially as described.

4. In a mold for the manufacture of blocks of artificial stone where use is made of the expanding property of lime or cement to obtain compression to solidify the blocks, the combination of a cylindrical shell, a butt-joint in said shell, means for rigidly closing said butt-joint, perforations in said shell, detachable ends, a thin metal lining, finer perforations in said lining arranged more closely than those in the shell, and flanges on said lining adapted to be closed by the butt-joint of the shell, substantially as set forth.

5. In a mold for the manufacture of blocks of artificial stone where use is made of the expanding property of lime or cement to obtain compression to solidify the blocks, the combination of a cylindrical shell, a butt-joint in said shell, fastening means attached to the meeting edges of the shell, bolt-holes in the fastening means in close proximity to the shell, bolts and nuts by which such fastening means are secured together, a recess in said fastening means adjacent to the said butt-joint, projections and recesses formed on or in said fastening means, perforations in said shell, detachable ends, a thin metal lining, and finer perforations arranged more closely together in said lining, substantially as set forth.

6. In a mold for the manufacture of blocks of artificial stone where use is made of the expanding property of lime or cement to obtain compression to solidify the blocks, the combination of a cylindrical shell, a butt-joint in said shell, fastening means attached to the meeting edges of the shell, bolt-holes in the fastening means in close proximity to the shell, bolts and nuts by which such fastening means are secured together, means for opening said shell, a recess in said fastening means adjacent to the said butt-joint, projections and recesses formed on or in said fastening means, screwed studs fixed in the ends of said fastening means, perforated portions attached to each end of the cylindrical shell, perforations in said shell, detachable ends, perforations in said ends, holes in the edges of said ends, nuts and bolts for securing the ends to the cylindrical shell, a thin metal lining, and finer perforations in said lining, substantially as set forth.

In testimony whereof I affix my signature in presence of two witnesses.

LEWIS PETER FORD.

Witnesses:
THOS. CRESSWELL,
WM. GIRLING.